(12) United States Patent
Liu et al.

(10) Patent No.: US 11,416,899 B2
(45) Date of Patent: Aug. 16, 2022

(54) ESTIMATION METHOD FOR WHOLE LIFE CYCLE COST OF POWER BATTERY IN ECHELON UTILIZATION

(71) Applicants: STATE GRID JIANGXI ELECTRIC POWER COMPANY LIMITED RESEARCH INSTITUTE, Jiangxi (CN); STATE GRID CORPORATION OF CHINA, Beijing (CN); NANCHANG KECHEN ELECTRIC POWER TEST AND RESEARCH CO., LTD, Jiangxi (CN); NANCHANG INSTITUTE OF TECHNOLOGY, Jiangxi (CN)

(72) Inventors: Ping Liu, Jiangxi (CN); Wenhua Zhang, Nanchang (CN); Rui Xu, Jiangxi (CN); Fayuan Wu, Jiangxi (CN); Yongqiang Deng, Jiangxi (CN); Xiaomin Dai, Jiangxi (CN); Jinhui Tang, Jiangxi (CN); Hongxia Xiao, Jiangxi (CN)

(73) Assignees: STATE GRID JIANGXI ELECTRIC POWER COMPANY LIMITED RESEARCH INSTITUTE, Jiangxi (CN); STATE GRID CORPORATION OF CHINA, Beijing (CN); NANCHANG KECHEN ELECTRIC POWER TEST AND RESEARCH CO., LTD, Jiangxi (CN); NANCHANG INSTITUTE OF TECHNOLOGY, Jiangxi (CN)

( * ) Notice: Subject to any disclaimer, the term of this patent is extended or adjusted under 35 U.S.C. 154(b) by 0 days.

(21) Appl. No.: 16/613,608

(22) PCT Filed: Jan. 8, 2019

(86) PCT No.: PCT/CN2019/070842
§ 371 (c)(1),
(2) Date: Nov. 14, 2019

(87) PCT Pub. No.: WO2020/010830
PCT Pub. Date: Jan. 16, 2020

(65) Prior Publication Data
US 2021/0334860 A1    Oct. 28, 2021

(30) Foreign Application Priority Data
Jul. 11, 2018  (CN) .......................... 201810759246.5

(51) Int. Cl.
*G01R 31/36* (2020.01)
*H02J 7/00* (2006.01)
(Continued)

(52) U.S. Cl.
CPC .......... *G06Q 30/0278* (2013.01); *B60L 58/16* (2019.02); *G01R 31/367* (2019.01);
(Continued)

(58) Field of Classification Search
CPC .. G06Q 30/0278; G06Q 10/087; G06Q 10/30; B60L 58/16; G01R 31/367;
(Continued)

(56) References Cited

U.S. PATENT DOCUMENTS

2011/0060565 A1* 3/2011 Sciarretta .......... H01M 10/4285
703/2
2011/0307202 A1* 12/2011 Benjamin ........ G01R 19/16542
702/63
(Continued)

FOREIGN PATENT DOCUMENTS

CN    103439665 A    12/2013
CN    105234097 A    1/2016
(Continued)

OTHER PUBLICATIONS

International Search Report and Written Opinion for the International Patent Application No. PCT/CN2019/070842, dated Apr. 9, 2019, 11 pages.

*Primary Examiner* — Talia F Crawley
(74) *Attorney, Agent, or Firm* — KDB Firm PLLC

(57) ABSTRACT

Disclosed is an estimation method for a whole life cycle cost of a power battery in echelon utilization. In this method, echelon utilization grades are established for the power battery according to an SOH of the power battery; a whole battery capacity model is constructed corresponding to the echelon utilization grades; a cost model is constructed corresponding to the echelon utilization grades; and a variation trend of the whole life cycle cost of the power battery is estimated according to the echelon utilization grades for the power battery, the power battery capacity model and the cost model, and a result of estimation is outputted.

5 Claims, 2 Drawing Sheets

(51) Int. Cl.
  *G06Q 30/02*    (2012.01)
  *G01R 31/392*   (2019.01)
  *G01R 31/367*   (2019.01)
  *B60L 58/16*    (2019.01)
  *G06F 30/20*    (2020.01)
  *G06Q 10/08*    (2012.01)
  *G06Q 10/00*    (2012.01)
  *G06F 111/10*   (2020.01)

(52) U.S. Cl.
  CPC ........... *G01R 31/392* (2019.01); *G06F 30/20* (2020.01); *G06Q 10/087* (2013.01); *G06Q 10/30* (2013.01); *G06F 2111/10* (2020.01)

(58) Field of Classification Search
  CPC ... G01R 31/392; G06F 30/20; G06F 2111/10; Y02T 10/70; Y02W 90/00
  See application file for complete search history.

(56) References Cited

U.S. PATENT DOCUMENTS

| | | | | |
|---|---|---|---|---|
| 2013/0158755 A1* | 6/2013 | Tang | ...................... | H01M 10/48 700/29 |
| 2013/0311117 A1* | 11/2013 | Chaturvedi | ............. | G06F 17/11 702/63 |
| 2014/0203783 A1* | 7/2014 | Kiesel | ............... | H01M 10/4257 320/167 |
| 2014/0207318 A1* | 7/2014 | Sisk | ......................... | B60L 58/16 701/22 |
| 2014/0278169 A1* | 9/2014 | Kim | .................... | G01R 31/3835 702/63 |
| 2014/0372053 A1* | 12/2014 | Lin | .......................... | B60L 58/16 702/63 |
| 2015/0002105 A1* | 1/2015 | Kelly | .................... | G01R 31/392 702/63 |
| 2015/0276887 A1* | 10/2015 | Shih | ...................... | G01R 31/392 702/63 |
| 2016/0169975 A1* | 6/2016 | Lin | ........................ | G01R 31/389 702/63 |
| 2016/0187428 A1* | 6/2016 | Basu | ..................... | G01R 31/367 702/63 |
| 2016/0363630 A1* | 12/2016 | Laskowsky | .......... | G01R 31/3835 |
| 2017/0074945 A1* | 3/2017 | Gelso | ...................... | B60L 58/16 |
| 2017/0285111 A1* | 10/2017 | Fife | .................. | G06Q 10/06313 |
| 2017/0328956 A1* | 11/2017 | Zhang | .................... | H01M 10/48 |
| 2018/0188329 A1* | 7/2018 | Huang | ............... | G01R 31/3648 |
| 2019/0036356 A1* | 1/2019 | Subbaraman | ........ | G01R 31/392 |
| 2019/0227126 A1* | 7/2019 | Books | ................ | G01R 31/3647 |
| 2020/0010336 A1* | 1/2020 | Montestruque | ......... | G01W 1/10 |
| 2020/0011931 A1* | 1/2020 | Lucidarme | ........... | G01R 31/392 |
| 2020/0018799 A1* | 1/2020 | Lim | ...................... | G01R 31/392 |
| 2021/0055353 A1* | 2/2021 | Yazami | .................. | H02J 7/005 |

FOREIGN PATENT DOCUMENTS

| | | | | | |
|---|---|---|---|---|---|
| CN | 105676144 A | | 6/2016 | | |
| CN | 106383316 A | * | 2/2017 | ......... | G01R 31/3648 |
| CN | 106383316 A | | 2/2017 | | |
| CN | 106845838 A | | 6/2017 | | |
| CN | 107634559 A | | 1/2018 | | |
| CN | 107785624 A | | 3/2018 | | |
| CN | 108845270 A | | 11/2018 | | |
| CN | 211507822 U | * | 9/2020 | | |
| CN | 111830421 A | * | 10/2020 | | |
| CN | 110126673 B | * | 12/2020 | .............. | B60L 58/18 |
| CN | 112366796 A | * | 2/2021 | | |
| CN | 112526352 A | * | 3/2021 | | |
| CN | 112572199 A | * | 3/2021 | | |
| CN | 112736951 A | * | 4/2021 | | |
| CN | 112986848 A | * | 6/2021 | | |
| CN | 113281657 A | * | 8/2021 | | |

* cited by examiner

ESTIMATION METHOD FOR WHOLE LIFE CYCLE COST OF POWER BATTERY IN ECHELON UTILIZATION

CROSS-REFERENCE TO RELATED APPLICATIONS

This is a National Stage Application, filed under 35 U.S.C. 371, of International Patent Application No. PCT/CN2019/070842, filed on Jan. 8, 2019, which claims priority to Chinese patent application No. 201810759246.5 filed on Jul. 11, 2018, contents of both of which are incorporated herein by reference in their entireties.

TECHNICAL FIELD

The present disclosure relates to the technical field of power batteries, for example, to an estimation method for a whole life cycle cost of the power battery in echelon utilization.

BACKGROUND

Power batteries are important components of electric automobiles and account for about 40% of a whole cost of an electric automobile. Although the cost of the power battery is mainly borne by electric automobile manufacturers at present, the cost is borne by consumers in actual service process, and the high cost limits further development of the electric automobile industry.

In addition to reduction of the production cost of the power battery via the research and development of new technologies and products, reasonable estimation of the whole life cycle cost of the power battery for the electric automobile and distribution of the cost of the power battery to all stages of the whole life cycle can also greatly reduce the cost of the power battery in a trial stage of the electric automobile and promotes the development of the electric automobile industry.

With the rapid development of the electric automobile industry, a tremendous number of power batteries are going to be decommissioned. Therefore, how to define and evaluate the value utilization and cost apportionment of the power batteries in an electric automobile stage, an energy storage stage and other application stages is especially necessary, but no related scheme exists at present.

SUMMARY

The following is a summary of the subject matter described herein in detail. This summary is not intended to limit the scope of the claims.

The embodiments of the present disclosure provide an estimation method for a whole life cycle cost of a power battery in echelon utilization, which avoids the above conditions in the related art and can realize the calculation of the whole life cycle cost of the power battery, thereby defining the division of service value and to-be-borne cost in multiple stages of the whole life cycle of the power battery.

In the estimation method for the whole life cycle cost of the power battery in echelon utilization, echelon utilization grades are established for the power battery according to the State of Health (SOH) of the power battery; a whole battery capacity model is constructed corresponding to the echelon utilization grades; a cost model is constructed corresponding to the echelon utilization grades; and a variation trend of the whole life cycle cost of the power battery is estimated according to the echelon utilization grades for the power battery, the power battery capacity model and the cost model, and a result of estimation is outputted.

Other aspects can be understood after the drawings and the detailed description are read and understood.

BRIEF DESCRIPTION OF DRAWINGS

The above and additional aspects of embodiments of the present disclosure will be readily understood from the following description of the embodiments in conjunction with the accompanying drawings, among which.

DETAILED DESCRIPTION

The present disclosure will be described clearly and completely in connection with the drawings in the embodiments of the present disclosure. The embodiments described below are part, not all, of the embodiments of the present disclosure.

An estimation method for a whole life cycle cost of a power battery in echelon utilization provided by an embodiment of the disclosure includes steps S1 to S4.

In step S1, echelon utilization grades are established for the power battery according to an SOH of the power battery.

The step S1 includes that three echelon utilization grades are established according to a scrapping standard of the power battery and the SOH of the power battery.

The scrapping standard of the power battery may be a scrapping standard for a lithium power battery in a new energy automobile. The power battery may be a lithium iron phosphate power battery.

In a first grade corresponding to the SOH from 80% to 100%, the power battery may be applied to the automobile.

In a second grade corresponding to the SOH from 40% to 80%, the power battery may be applied to power storage such as wind-solar power storage, peak-cut and backup power sources.

In a third grade corresponding to the SOH from 0 to 40%, the power battery should be scrapped and recovered.

In step S2, a whole battery capacity model is constructed corresponding to the echelon utilization grades.

Figure 1:
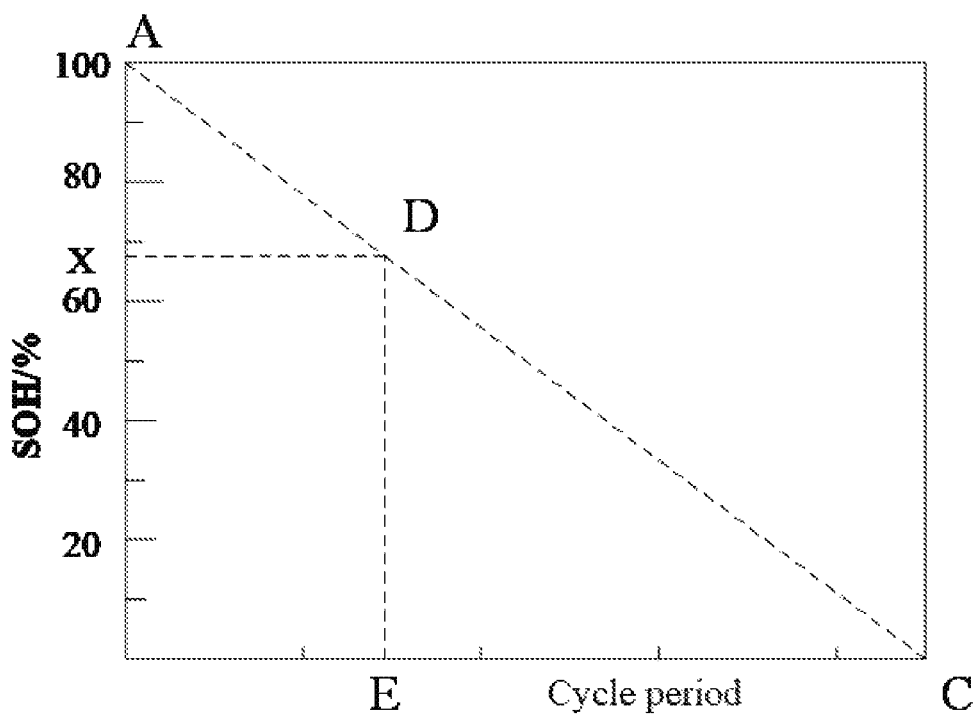
FIG. 1 is a diagram illustrating variation of an SOH of a power battery with a cyclic period in an embodiment of the present disclosure.

The step S2 includes that a linear curve graph of the SOH of the power battery over a cyclic period is constructed. The relationship between the SOH of the lithium ion power battery and the cyclic period is basically a linear relationship according to a performance attenuation rule of the power battery. Referring to FIG. 1, the linear curve graph has an abscissa representing the cyclic period and an ordinate representing the SOH, and an origin of coordinates of the linear curve graph is set as a point B. A position of a maximum value of the ordinate is set as a point A, and a position of the maximum value of the abscissa is set as a point C.

The SOH of a brand new power battery is set to decrease from 100% to a value x, and the value x is in a range of [0, 1]. The value x corresponds to a point D in the linear curve graph, and a perpendicular originating from the point D intersects with the abscissa at a point E. A used capacity of the power battery is defined as $Q_X$, and a whole life cycle capacity of the power battery is defined as $Q_T$. The capacity utilization rate is defined as $\eta = Q_X/Q_T \times 100\%$, and the used capacity $Q_X$ represents a product of an area $S_{trapezoid\_ABED}$ enclosed by an trapezoid ABED in the linear curve graph and a rate capacity $C_0$ of a cell, and the whole life cycle capacity $Q_T$ represents a product of an area $S_{\triangle ABC}$ enclosed by a triangle ABC and the rate capacity $C_0$ of the cell, as shown in the following formulas:

$$S_{\triangle DEC} = x^2 \cdot S_{\triangle ABC} \quad (1)$$

$$Q_T = C_0 \cdot S_{\triangle ABC} \quad (2)$$

$$Q_X = C_0 \cdot S_{trapezoid\_ABED} = C_0 \cdot (S_{\triangle ABC} - S_{\triangle DEC}) = C_0 \cdot S_{\triangle ABC} (1-x^2) \quad (3)$$

$$\eta = Q_X/Q_T \times 100\% = [C_0 \cdot S_{\triangle ABC}(1-x^2)]/[C_0 \cdot S_{\triangle ABC}] \times 100\% = 100(1-x^2)\% \quad (4)$$

As can be seen from formulas (1) to (4), $Q_X$ is proportional to $x^2$, $Q_T$ is proportional to $S_{\triangle ABC}$, and $\eta$ is independent of $S_{\triangle ABC}$ and is determined only by the SOH of the power battery. Therefore, the capacity utilization rate $\eta$ of any power battery may be calculated by the SOH at any time.

Figure 2:
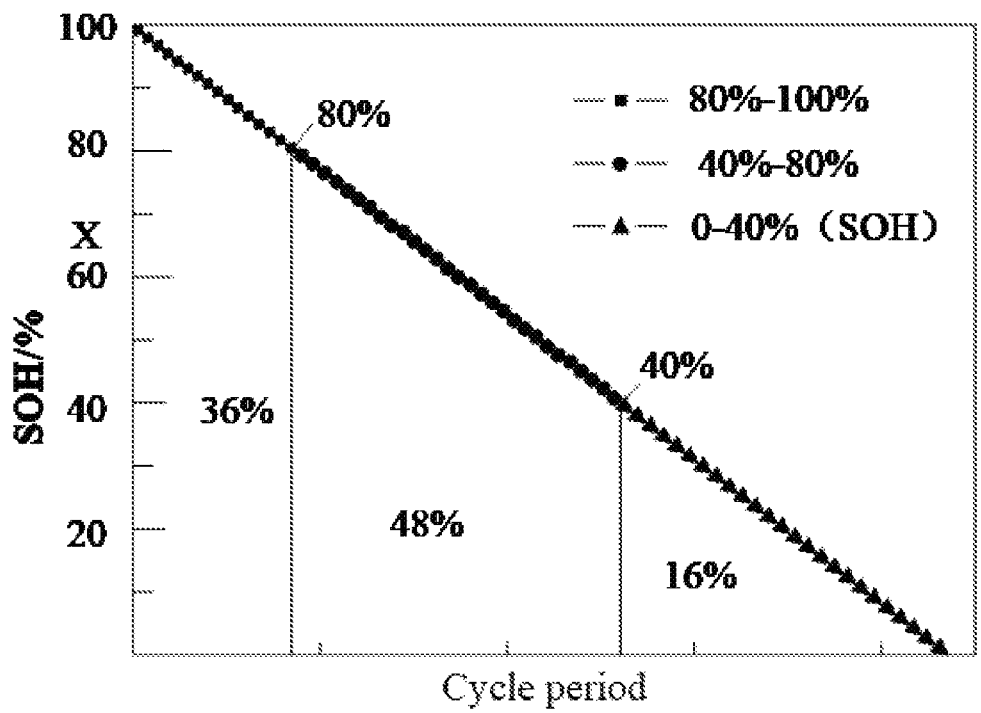
FIG. 2 is a diagram illustrating battery service capacity of the power battery in respective SOH intervals according to an embodiment of the present disclosure.

A battery service capacity in each SOH interval is calculated according to the formulas (1) to (4) and the echelon utilization grades for the lithium iron phosphate power battery. As shown in FIG. 2, in the first grade corresponding to an SOH interval from 80% to 100%, a whole practical capacity of the power battery throughout the SOH interval from 80% to 100% accounts for 36% of a whole life cycle capacity; in the second grade corresponding to an SOH interval from 40% to 80%, a whole practical capacity of the power battery throughout the SOH interval from 40% to 80% accounts for 48% of the whole life cycle capacity; and in the third grade corresponding to an SOH interval from 0% to 40%, a whole practical capacity of the power battery throughout the SOH interval from 0% to 40% accounts for 16% of the whole life cycle capacity.

In step S3, a cost model is constructed corresponding to the echelon utilization grades.

In the step S3, in a case of a service cut-off capacity of 80% for an electric automobile, a whole service capacity for the electric automobile throughout an SOH interval from 100% to 80% accounts for 36% of the whole life cycle capacity; and in a case of a service cut-off capacity of 40% for energy storage, a whole service capacity for the energy storage throughout an SOH interval from 80% to 40% accounts for 48% of the whole life cycle capacity. A sum of the whole service capacity for the electric automobile and the whole service capacity for the energy storage accounts for 84% of the whole life cycle capacity and is a capacity $Q_V$ with service value and is defined as the whole life cycle high-quality capacity; the whole service capacity for the electric automobile accounts for 3/7 of the whole life cycle high-quality capacity, and the whole service capacity for the energy storage accounts for 4/7 of the whole life cycle high-quality capacity.

The cost of the power battery is shared between the electric automobile and the energy storage using the power battery in an SOH interval from 100% to 40%, regardless of a value of recovery and a cost of scrapping of the power battery with the SOH less than 40%;

For a batch of grouped power batteries, not all of the power batteries can be used in echelon utilization. For example, the echelon utilization grouping rate is different for power batteries of different quality standards and different manufacturers. The better the quality of the power battery is, the higher the echelon utilization grouping rate is.

The echelon utilization grouping rate is $\gamma$, and the unit price of the power battery is M, then a theoretical cost $Pe^{\ominus}$ to be borne by the electric automobile is expressed using a formula:

$$Pe^{\ominus} = \left[\frac{3}{7}Q_V + \frac{4}{7}Q_V \cdot (1-\gamma)\right] \cdot M / Q_V = \left(1 - \frac{4}{7}\gamma\right) \cdot M \quad (5)$$

a theoretical cost $Ps^{\ominus}$ to be borne by the energy storage is expressed using a formula:

$$Ps^{\ominus} = \left[1 - \left(1 - \frac{4}{7}\gamma\right)\right] \cdot M = \frac{4}{7}\gamma \cdot M. \quad (6)$$

A value factor p is set to represent a ratio between a unit capacity cost applied to the electric automobile and a unit capacity cost applied to the energy storage, where p is greater than 1.

A practical cost Ps to be borne by the energy storage battery is expressed using a formula:

$$Ps = \frac{4}{7p}\gamma M \quad (7)$$

a practical cost Pe to be borne by the electric automobile is expressed using a formula:

$$Pe = \left(1 - \frac{4}{7p}\gamma\right)M. \quad (8)$$

In step S4, a cost variation trend of the lithium iron phosphate power battery in the whole life cycle is estimated according to data obtained from the steps S1 to S3, and a result of estimation is outputted.

In the step S4, based on the formula of the step S3, the practical cost to be borne by the energy storage accounts for a proportion Ps % of a whole cost of the power battery, and the proportion Ps % is expressed using a formula:

$$Ps\% = \left(\frac{4}{7p}\gamma M / M\right) \times 100\% = \frac{4}{7p}\gamma \times 100 \quad (9)$$

a proportion Pe % of the practical cost of the power battery to be borne by the electric automobile to the whole cost of the power battery is expressed using a formula:

$$Pe\% = \left(1 - \frac{4}{7p}\gamma\right) \cdot M / M \times 100\% = \left(1 - \frac{4}{7p}\gamma\right) \times 100\% \quad (10)$$

a curve graph of Ps % is drawn according to the formula of Ps %, a curve graph of Pe % is drawn according to the formula of Pe %, and a curve graph of $\gamma/p$ is drawn according to the formula of Ps % and the formula of Pe %.

The following is description with reference to an embodiment.

Figure 3:
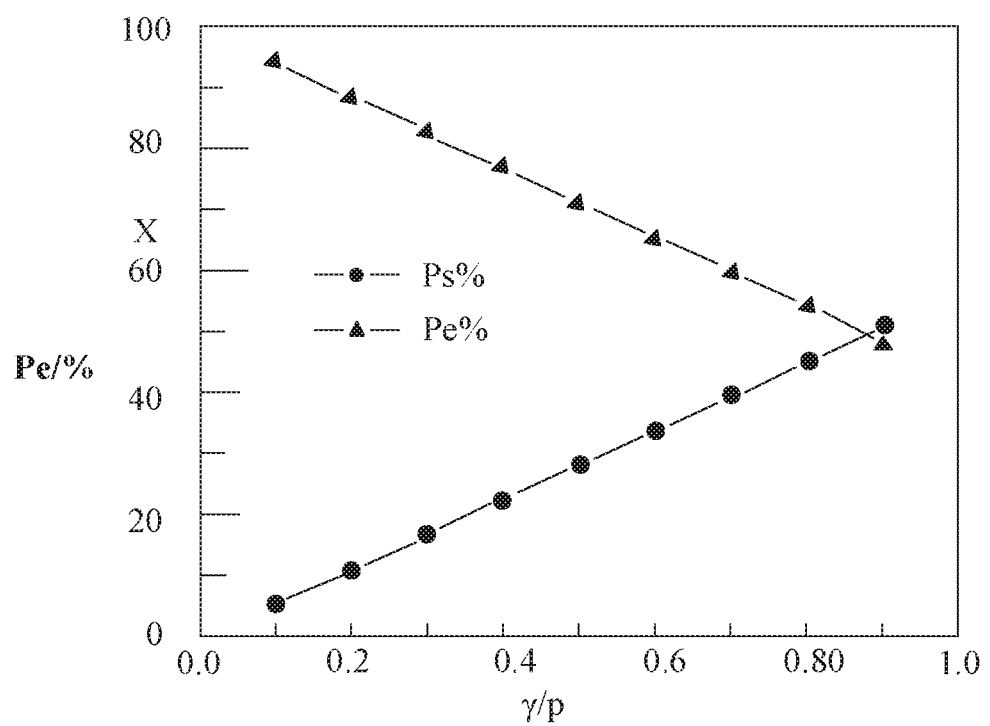
FIG. 3 is a diagram illustrating a relationship between a cost ratio of the power battery and $\gamma/p$ in an embodiment of the present disclosure.

The price factor p is determined to be in an interval (1, 5] according to a market law, the echelon utilization grouping rate γ is assumed to be in an interval (0.5, 0.9), and the γ/p falls in an interval (0.1, 0.9). The plotted curve graphs of the Ps %, the Pe % and the γ/p are shown in FIG. 3. As can be seen from FIG. 3, as the γ/p increases, the cost proportion Ps % of the power battery for the energy storage gradually increases and the cost proportion Pe % of the power battery for the electric automobile gradually decreases. When γ/p=0.875, the cost of the power battery for the energy storage is the same as the cost of the power battery for the electric automobile, each accounting for 50% of the whole cost.

Here, the price factor p is set to be p=2, and the grouping rate γ is set to be γ=0.8.

The cost Pe to be borne by the electric automobile is:

$$Pe = \left(1 - \frac{4}{7 \times 2} \times 0.8\right) \cdot M = 0.77\ M.$$

The cost Ps to be borne by the energy storage battery is:

$$Ps = \frac{4}{7 \times 2} \times 0.8 \cdot M = 0.23\ M.$$

The proportion Pe % of the cost of the power battery to be borne by the electric automobile to the whole cost of the power battery is:

$$Pe\ \% = \left(1 - \frac{4}{7 \times 2} \times 0.8\right) \times 100\% = 0.77\%.$$

The proportion Ps % of the cost of the power battery to be borne by the energy storage to the whole cost of the power battery is:

$$Ps = \frac{4}{7 \times 2} \times 0.8 \times 100\% = 0.23\%.$$

The unit price of a single lithium iron phosphate power battery of 60 Ah is assumed to be 500 CNY.

When the price factor p=2 and the grouping rate γ=0.8, for each single power battery, the cost to be borne by the electric automobile is 385 CNY, and the cost to be borne by the energy storage is 115 CNY.

It should be noted that the method in the embodiment of the present disclosure may be applied to different types of power batteries with different capacities. For different situations, when the whole life cycle cost of the power battery is estimated, the price factor and the grouping rate are determined according to the actual situation. And the determined numerical values are substituted into a proportional formula of the cost of the power battery to be borne by the electric automobile in the whole power battery cost and a proportional formula of the cost of the power battery to be borne by the energy storage in the whole battery cost, so as to obtain an estimation result of the whole life cycle cost of the power battery.

Therefore, compared with the related art, the present disclosure provides an estimation method for a whole life cycle cost of the power battery in echelon utilization. By means of this method, the whole life cycle cost of the electric automobile power battery can be reasonably estimated, the value utilization and the cost apportionment are divided to respective stages of the whole life cycle of the power battery, and important significance is followed for defining and evaluating the value utilization and the cost apportionment of the power battery in the electric automobile stage, the energy storage state and other application stages. The method is simple and effective. Through combining parameters such as grouping rate and value factor, the method reasonably estimates the whole life cycle cost of the power battery and avoids the conditions of unclear cost division of the power battery and difficulty in estimation.

In the description of the specification, the description using reference terms "an embodiment", "some embodiments", "example", "specific example", "some examples" and the like means a specific characteristic, a structure, a material or a feature described in connection with the embodiment or the example is included in at least one embodiment or example of the present disclosure. In the specification, the illustrative description of the preceding terms does not necessarily refer to the same embodiment or example. Moreover, the described specific characteristics, structures, materials or features may be combined properly in any embodiments or examples.

What is claimed is:

1. An estimation method for a whole life cycle cost of a power battery in echelon utilization, comprising:
    establishing a plurality of echelon utilization grades for the power battery according to a scrapping standard of the power battery and an State Of Health (SOH) of the power battery; wherein the plurality of echelon utilization grades comprises: a first grade, corresponding to the SOH from 80% to 100%; a second grade, corresponding to the SOH from 40% to 80%; and a third grade, corresponding to the SOH from 0 to 40%;
    constructing a whole battery capacity model corresponding to the echelon utilization grades;
    constructing a cost model corresponding to the echelon utilization grades; and
    estimating a variation trend and cost apportionment of the whole life cycle cost of the power battery according to the echelon utilization grades for the power battery, the power battery capacity model and the cost model; wherein the cost apportionment comprises the costs corresponding to the first stage, the second stage and the third stage respectively; and
    outputting a result of estimation.

2. The estimation method according to claim 1, wherein the power battery is a lithium iron phosphate power battery.

3. The estimation method according to claim 1, wherein in the construction of the whole battery capacity model corresponding to the echelon utilization grades,
    a linear curve graph of the SOH of the power battery over a cyclic period is constructed according to a performance attenuation rule of the power battery, wherein the linear curve graph has an abscissa representing the cycle period and an ordinate representing the SOH, an origin of coordinates of the linear curve graph is set as a point B, a position of a maximum value of the ordinate is set as a point A, and a position of the maximum value of the abscissa is set as a point C;
    the SOH of an unused power battery is set to decrease from 100% to a value x, wherein the value x is in a range of [0, 1]; the value x corresponds to a point D in the linear curve graph, and a perpendicular originating from the point D intersects with the abscissa at a point E; a used capacity of the power battery is defined as $Q_X$, a whole life cycle capacity of the power battery is defined as $Q_T$, and the capacity utilization rate is defined as $\eta = Q_X/Q_T \times 100\%$, the used capacity $Q_X$ corresponds to a product of an area $S_{trapezoid\_ABED}$ enclosed by an trapezoid ABED in the linear curve graph and a rate capacity $C_0$ of a cell, and the whole life cycle capacity $Q_T$ corresponds to a product of an area $S_{\triangle ABC}$ enclosed by a triangle ABC and the rate capacity $C_0$ of the cell, as shown in the following formulas:

$S_{\triangle DEC} = x^2 \cdot S_{\triangle ABC}$ $Q_T = C_0 \cdot S_{\triangle ABC}$ $Q_X = C_0 \cdot S_{trapezoid\_ABED} = C_0 \cdot (S_{\triangle ABC} - S_{\triangle DEC}) = C_0 \cdot S_{\triangle ABC}(1-x^2)$ $\eta = Q_X/Q_T \times 100\% = [C_0 \cdot S_{\triangle ABC}(1-x^2)]/[C_0 \cdot S_{\triangle ABC}] \times 100\% = 100(1-x^2)\%$ a battery service capacity in each SOH interval is calculated according to the formulas and the echelon utilization grades of the power battery, wherein in the first grade corresponding to an SOH interval from 80% to 100%, a whole practical capacity of the power battery throughout the SOH interval from 80% to 100% accounts for 36% of a whole life cycle capacity; wherein the whole practical capacity of the power battery is a usable capacity of the power battery;

in the second grade corresponding to an SOH interval from 40% to 80%, the whole practical capacity of the power battery throughout the SOH interval from 40% to 80% accounts for 48% of the whole life cycle capacity; and in the third grade corresponding to an SOH interval from 0% to 40%, the whole practical capacity of the power battery throughout the SOH interval from 0% to 40% accounts for 16% of the whole life cycle capacity.

4. The estimation method according to claim 3, wherein in the construction of the cost model corresponding to the echelon utilization grades, in a case of a service cut-off capacity of 80% for an electric automobile, a whole service capacity for the electric automobile throughout an SOH interval from 100% to 80% accounts for 36% of the whole life cycle capacity; and in a case of a service cut-off capacity of 40% for energy storage, a whole service capacity for the energy storage throughout an SOH interval from 80% to 40% accounts for 48% of the whole life cycle capacity, a sum of the whole service capacity for the electric automobile and the whole service capacity for the energy storage accounts for 84% of the whole life cycle capacity, is a capacity $Q_V$ with use value and is defined as the whole life cycle high-quality capacity; the whole service capacity for the electric automobile accounts for 3/7 of the high-quality capacity of the whole life cycle high-quality capacity, and the whole service capacity for the energy storage accounts for 4/7 of the whole life cycle high-quality capacity; wherein the whole service capacity for the electric automobile represents a total capacity of the power battery that can be used by the electric automobile, the whole service capacity for the energy storage represents a total capacity of the power battery that can be used by the energy storage;

a cost of the power battery is shared between the electric automobile and the energy storage using the power battery in an SOH interval from 100% to 40%, regardless of a value of recovery and a cost of scrapping of the power battery with the SOH less than 40%;

an echelon utilization grouping rate is $\gamma$, and a unit price of the power battery is M, a theoretical cost $Pe^\ominus$ to be borne by the electric automobile is expressed using a formula:

$$Pe^\ominus = \left[\frac{3}{7}Q_V + \frac{4}{7}Q_V \cdot (1-\gamma)\right] \cdot M/Q_V = \left(1 - \frac{4}{7}\gamma\right) \cdot M;$$

a theoretical cost $Ps^\ominus$ to be borne by the energy storage is expressed using a formula:

$$Ps^\ominus = \left[1 - \left(1 - \frac{4}{7}\gamma\right)\right] \cdot M = \frac{4}{7}\gamma \cdot M;$$

a value factor p is set to represent a ratio between a unit capacity cost applied to the electric automobile and a unit capacity cost applied to the energy storage, wherein p is greater than 1;

a practical cost Ps to be borne by the energy storage battery is expressed using a formula:

$$Ps = \frac{4}{7p}\gamma M;$$

a practical cost Pe to be borne by the electric automobile is expressed using a formula:

$$Pe = \left(1 - \frac{4}{7p}\gamma\right)M.$$

5. The estimation method according to claim 4, wherein in the estimation of the variation trend of the whole life cycle cost of the power battery according to the echelon utilization grades for the power battery, the power battery capacity model and the cost model, based on the formula $$Ps = \frac{4}{7p}\gamma M,$$

the practical cost to be borne by the energy storage accounts for a proportion Ps % of a whole cost of the power battery, wherein the proportion Ps % is expressed using a formula:

$$Ps\% = \left(\frac{4}{7p}\gamma M/M\right) \times 100\% = \frac{4}{7p}\gamma \times 100\%;$$

base on the formula $$Pe = \left(1 - \frac{4}{7p}\gamma\right)M,$$

the practical cost to be borne by the electric automobile accounts for a proportion Pe % of the whole cost of the power battery, wherein the proportion Pe % is expressed using a formula:

$$Pe\ \% = \left(1 - \frac{4}{7p}\gamma\right) \cdot M/M \times 100\% = \left(1 - \frac{4}{7p}\gamma\right) \times 100\%;$$

a curve graph of Ps % is drawn according to the formula of Ps %, a curve graph of Pe % is drawn according to the formula of Pe %, and a curve graph of γ/p according to the formula of Ps % and the formula of Pe %.

\* \* \* \* \*